(12) United States Patent
Asada et al.

(10) Patent No.: US 11,438,077 B2
(45) Date of Patent: Sep. 6, 2022

(54) SUBMARINE OPTICAL TRANSMISSION APPARATUS AND SUBMARINE OPTICAL COMMUNICATION SYSTEM

(71) Applicant: NEC Corporation, Tokyo (JP)

(72) Inventors: Hideo Asada, Tokyo (JP); Kazuyuki Shishido, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/040,419

(22) PCT Filed: Mar. 15, 2019

(86) PCT No.: PCT/JP2019/010734
§ 371 (c)(1),
(2) Date: Sep. 22, 2020

(87) PCT Pub. No.: WO2019/181762
PCT Pub. Date: Sep. 26, 2019

(65) Prior Publication Data
US 2021/0075519 A1    Mar. 11, 2021

(30) Foreign Application Priority Data
Mar. 23, 2018    (JP) .............................. JP2018-056773

(51) Int. Cl.
*H04B 10/27*    (2013.01)
*H04B 10/80*    (2013.01)
(Continued)

(52) U.S. Cl.
CPC ........... *H04B 10/80* (2013.01); *G02B 6/4427* (2013.01); *H04B 10/27* (2013.01); *H04B 10/501* (2013.01)

(58) Field of Classification Search
CPC ...... H04B 10/80; H04B 10/27; H04B 10/501; G02B 6/4427
See application file for complete search history.

(56) References Cited

U.S. PATENT DOCUMENTS

| 5,222,176 A | * | 6/1993 | Webber | ................ G02B 6/4446 385/99 |
| 2003/0072062 A1 | * | 4/2003 | Pedersen | ............ H04B 10/2916 398/181 |

(Continued)

FOREIGN PATENT DOCUMENTS

| CA | 2608401 A1 | 11/2006 |
| JP | S57-148889 U | 9/1982 |

(Continued)

OTHER PUBLICATIONS

International Search Report corresponding to PCT/JP2019/010734 dated Jun. 4, 2019 (2 pages).

(Continued)

*Primary Examiner* — Dzung D Tran

(57) ABSTRACT

An object to provide a submarine optical transmission apparatus capable of efficiently housing optical components and electric components. A submarine optical transmission apparatus includes a case, an electric component housing unit, and an optical component housing unit. The electric component housing unit and the optical component housing unit can house either or both of an optical component and an electric component and are stacked in a Z-direction. The case can house the electric component housing unit and the optical component housing unit that are stacked, and a longitudinal direction thereof is an X-direction.

18 Claims, 10 Drawing Sheets

(51) Int. Cl.
    *G02B 6/44*    (2006.01)
    *H04B 10/50*   (2013.01)

(56)              References Cited

U.S. PATENT DOCUMENTS

2005/0036751 A1    2/2005  Young et al.
2005/0185257 A1*   8/2005  Young ................. G02B 6/4428
                                                         359/333
2005/0201709 A1*   9/2005  DeVincentis ........ G02B 6/4428
                                                         385/135
2016/0097872 A1*   4/2016  Fernihough ............. G01P 15/18
                                                         367/15

FOREIGN PATENT DOCUMENTS

JP           S58-60833 A      4/1983
JP          60-180156 U      11/1985
JP         H01-202704 A       8/1989
JP         H04-106505 A       4/1992
JP          H7-336309 A      12/1995
JP         2001-320826 A     11/2001
JP         2005-292386 A     10/2005
JP         2008-541461 A     11/2008
WO           03/030203 A1     4/2003
WO     WO-2004/055553 A2      7/2004
WO     WO-2006/124703 A2     11/2006

OTHER PUBLICATIONS

Extended European Search Report for EP Application No. EP19771856.2 dated Mar. 31, 2021.
Japanese Office Action for JP Application No. 2020-508303 dated Apr. 5, 2022 with English Translation.

* cited by examiner

SUBMARINE OPTICAL TRANSMISSION APPARATUS AND SUBMARINE OPTICAL COMMUNICATION SYSTEM

CROSS REFERENCE TO RELATED APPLICATIONS

This application is a national stage application of International Application No. PCT/JP2019/010734 entitled "Submarine Optical Transmission Device and Submarine Optical Communications System" filed on Mar. 15, 2019, which claims priority to Japanese Patent Application No. JP2018-056773 filed on Mar. 23, 2018, the disclosures of which are hereby incorporated by reference in their entirety.

TECHNICAL FIELD

The present invention relates to a submarine optical transmission apparatus and a submarine optical communication system

BACKGROUND ART

In a submarine optical communication system, land base stations are connected through submarine cables, and optical communication is performed between the base stations. Various submarine optical transmission apparatuses are connected to the submarine cable. An optical component for amplifying a transmitted optical signal and controlling a transmission path of the optical signal is mounted on the submarine optical transmission apparatus.

As an example of a submarine optical transmission apparatus, an optical submarine repeater having a plurality of subunits has been proposed (Patent Literature 1). In this optical submarine repeater, the subunits are arranged in a longitudinal direction of a cylindrical case. The subunit is provided with optical components, optical fibers connected to the optical components, and electric components such as a power supply and a control circuit. The subunits are connected by wiring (optical fibers and electric wiring).

CITATION LIST

Patent Literature

[Patent Literature 1] Japanese Unexamined Patent Application Publication No. 2001-320826

SUMMARY OF INVENTION

Technical Problem

Due to an increase in communication traffic, advanced and flexible signal control are required in the submarine optical transmission apparatus. To achieve this, the number of optical components and electric components mounted on the submarine optical transmission apparatus is increasing. On the other hand, in the above-described configuration of the submarine optical transmission apparatus, the number of components can be increased by increasing the number of subunits. However, a structure of the wiring connecting the subunits becomes complicated, and a wiring connecting work becomes difficult. Further, as the number of interconnections between the subunits increases, a space occupied by the interconnections increases, and thereby the number of components to be mounted is limited.

The present invention has been made in view of the above-mentioned problem, and an object of the present invention is to provide a submarine optical transmission apparatus capable of efficiently housing optical components and electric components.

Solution to Problem

An aspect of the present invention is a submarine optical transmission apparatus including: a plurality of first component housing units configured to be capable of housing either or both of an optical component and an electric component and to be stacked in a first direction; and a case configured to be capable of housing the stacked first component housing units, a longitudinal direction thereof being a second direction orthogonal to the first direction.

An aspect of the present invention is a submarine optical communication system including: a first base station and a second base station provided on land; and a submarine optical transmission apparatus connected to the first base station and the second base station through submarine cables, in which the submarine optical transmission apparatus includes: a plurality of first component housing units configured to be capable of housing either or both of an optical component and an electric component and to be stacked in a first direction; and a case configured to be capable of housing the stacked first component housing units, a longitudinal direction thereof being a second direction orthogonal to the first direction.

Advantageous Effects of Invention

According to the present invention, it is possible to provide a submarine optical transmission apparatus capable of efficiently housing optical components and electric components.

DESCRIPTION OF EMBODIMENTS

Figure 1:
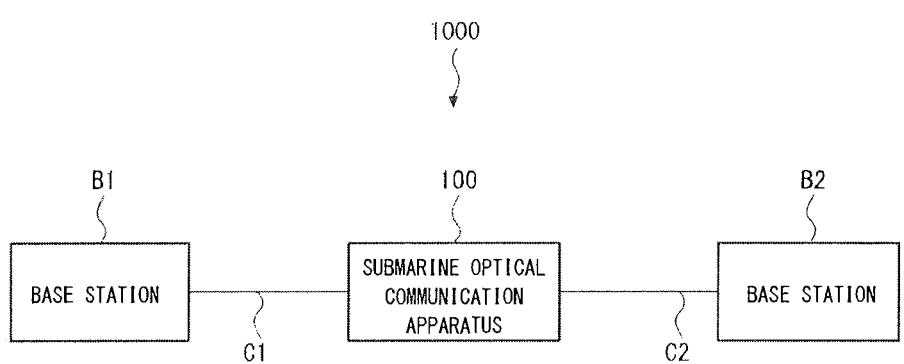
FIG. 1 illustrates a basic configuration of a submarine optical communication system a submarine optical communication apparatus according to a first example embodiment.

Example embodiments of the present invention will be described below with reference to the drawings. In the drawings, the same elements are denoted by the same reference numerals, and thus a repeated description is omitted as needed.

First Example Embodiment

A submarine optical communication apparatus 100 according to a first example embodiment will be described. FIG. 1 illustrates a basic configuration of a submarine optical communication system 1000 including the submarine optical communication apparatus 100 according to the first example embodiment. The submarine optical communication system 1000 includes the submarine optical communication apparatus 100 and base stations B1 and B2.

The base station B1 (also referred to as a first base station) and the base station B2 (also referred to as a second base station) are provided on land. The base station B1 is connected with the submarine optical communication apparatus 100 laid on the seabed by a submarine cable C1. The submarine cable C1 includes various cables such as an optical fiber and an electric cable. Thus, the base station B1 can communicate an optical signal and an electric signal with the submarine optical communication apparatus 100 through the submarine cable C1 and supply power to the submarine optical communication apparatus 100 as appropriate. The base station B2 is connected with the submarine optical communication apparatus 100 laid on the seabed by a submarine cable C2. As in the case of the submarine cable C1, the submarine cable C2 includes various cables such as an optical fiber and an electric cable. Thus, the base station B2 can communicate the optical signal and the electric signal with the submarine optical communication apparatus 100 through the submarine cable C2 and supply power to the submarine optical communication apparatus 100 as appropriate.

The submarine optical communication apparatus 100 is an apparatus to receive optical signals output from the base stations B1 and B2, and to output optical signals to the base stations B1 and B2. The submarine optical communication apparatus 100 can be used as a repeater that transfers the optical signal output from one of the base stations B1 and B2 to the other of the base stations B1 and B2. Further, the submarine optical communication apparatus 100 can be used as a submarine optical branching apparatus that branches a part of the optical signal output from one of the base stations B1 and B2 to a base station other than the base stations B1 and B2 (not illustrated in the drawings).

The submarine optical communication apparatus 100 may be controlled by an electric signal output from one or both of the base stations B1 and B2. The submarine optical communication apparatus 100 may output an electric signal to one or both of the base stations B1 and B2 to notify a state of the submarine optical communication apparatus 100 thereto.

Note that the configuration illustrated in FIG. 1 is merely the basic configuration of the submarine optical communication system 1000, and it should be appreciated that other base stations and other submarine optical communication apparatuses may be provided as appropriate.

Hereinafter, a configuration of the submarine optical communication apparatus 100 will be described. The submarine optical communication apparatus 100 is laid on the seabed in a state of being connected to a submarine cable. Therefore, the submarine optical communication apparatus 100 is configured to have a shape extending in an extension direction of the submarine cable. This reduces risk of damage to the submarine optical communication apparatus 100 and the submarine cables during installation.

Figure 2:
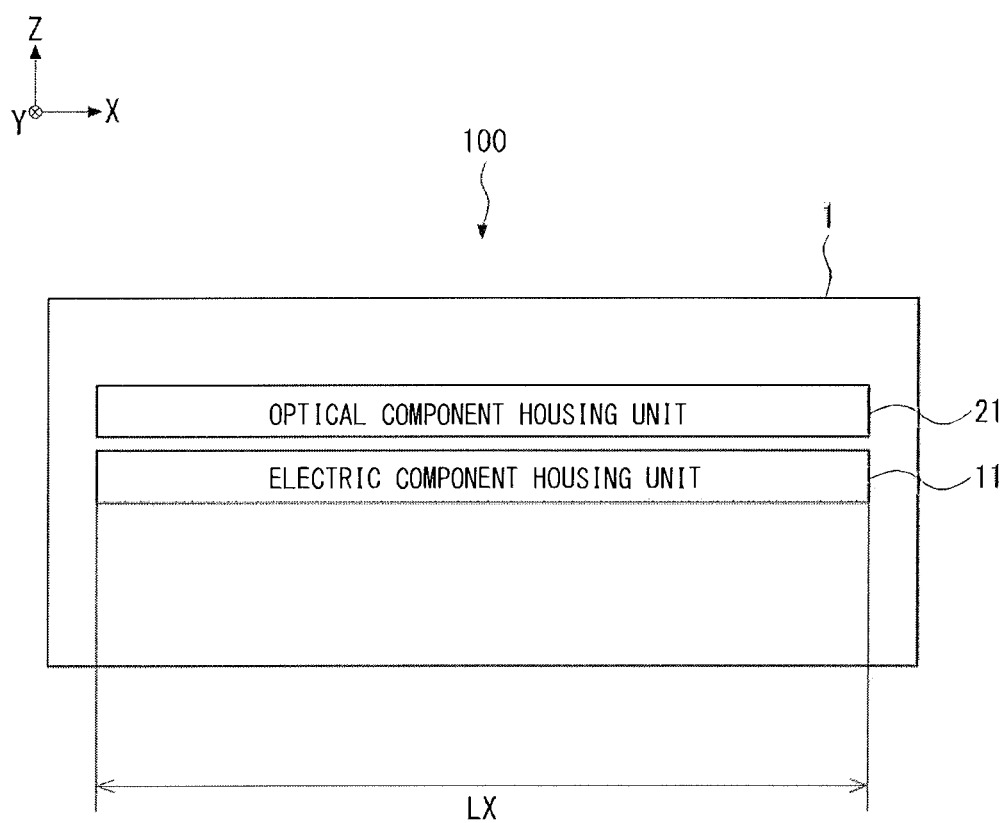
FIG. 2 illustrates a configuration of a cross section parallel to a longitudinal direction of the submarine optical communication apparatus according to the first example embodiment.
Figure 3:
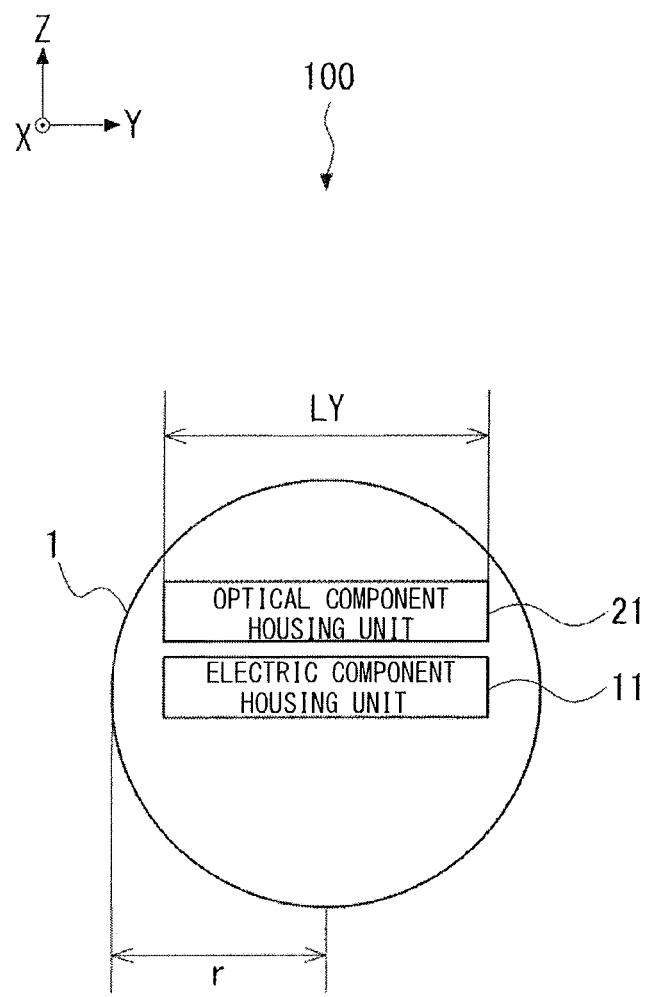
FIG. 3 illustrates a configuration of a cross section normal to the longitudinal direction of the submarine optical communication apparatus according to the first example embodiment.

FIG. 2 illustrates a configuration of a cross section parallel to a longitudinal direction of the submarine optical communication apparatus 100 according to the first example embodiment. FIG. 3 illustrates a configuration of a cross section normal to the longitudinal direction of the submarine optical communication apparatus 100 according to the first example embodiment. The submarine optical communication apparatus 100 includes a case 1 and a plurality of component housing units disposed in the case 1.

The case 1 is a member having mechanical strength capable of protecting members held therein against water pressure. The case 1 is a cylindrical member whose axial direction is the longitudinal direction of the submarine optical communication apparatus 100. In the internal space of the case 1, the component housing units in which various components used for transmission of optical signals are mounted are stacked. In the present example embodiment, the submarine optical communication apparatus 100 includes an electric component housing unit 11 and an optical component housing unit 21 as the component housing units. Hereinafter, each of the electric component housing unit and the optical component housing unit that are stacked is referred to as a first component housing unit.

Both ends of the case 1 in the axial direction (X-direction) are connected to the submarine cables, for example. Alternatively, components connected to the submarine cables are disposed inside or outside of both ends of the case 1 in the axial direction (X-direction).

In FIG. 2, the horizontal direction on the plane of the drawing is the axial direction (X-direction), and a direction orthogonal to the X-direction on the plane is a stacking direction (Z-direction). In FIG. 2, a direction orthogonal to the axial direction (X-direction) and the stacking direction (Z-direction), that is, a direction normal to the plane is a Y-direction. Hereinafter, the axial direction (X-direction) is also referred to as a second direction, and the stacking direction (Z-direction) is also referred to as a first direction.

In FIG. 3, the horizontal direction on the plane of the drawing is the Y-direction, and a direction orthogonal to the Y-direction on the plane is the stacking direction (Z-direction). In FIG. 3, a direction orthogonal to the Y-direction and the stacking direction (Z-direction), that is, the direction normal to the plane is the X-direction.

As illustrated in FIGS. 2 and 3, the electric component housing unit 11 and the optical component housing unit 21 are stacked in the direction (Z-direction) orthogonal to the axial direction (X-direction) of the housing 1. The electric component housing unit 11 is provided with electric components used for signal conversion and electric signal processing in optical signal transmission. The optical component housing unit 21 is provided with optical components for transmitting the optical signal through the submarine cable and receiving the optical signal. In the electric component housing unit 11 and the optical component housing unit 21, a plurality of components are mounted on a rectangular plate-like member having a surface (X-Y plane) normal to the stacking direction (Z-direction) as a principal surface.

Hereinafter, an area of a component mounting surface of the component housing unit will be discussed. The areas of the component mounting surfaces of the electric component housing unit 11 and the optical component housing unit 21 are determined by a length LX in the X-direction and a length LY in the Y-direction. On the other hand, in the submarine optical repeater according to Patent Literature 1, the subunits are arranged in the axial direction (X-direction). Therefore, a shape of the component mounting surface of the subunit is circular. Accordingly, the area of the component mounting surface of the subunit is determined by the radius r.

The case 1 is designed to have a shape in which the length LX in the axial direction is sufficiently longer than the diameter 2r of the case 1. Therefore, it is possible to easily cause the area of the component mounting surface of the component housing unit to be larger than the area of the circular cross section normal to the axial direction (X-direction) of the case 1.

As described above, it can be understood that the area of the component mounting surface of the component housing unit of the electric component housing unit 11 and the optical component housing unit 21 can be larger than that of the circular cross section of the subunit. Therefore, more components can be mounted on the electric component housing unit 11 and the optical component housing unit 21 as compared to the subunit described above. As a result, the number of the component housing units can be reduced to less than the number of subunits. Thus, since the relatively large number of the components can be collectively mounted on the component housing unit, a component mounting work can be efficiently performed.

In the case of the subunit, it is necessary to connect components dispersedly mounted in a plurality of subunits between the subunits. Therefore, the number of wires between the subunits increases. On the other hand, in the present configuration, the components connected between the subunits can be mounted in the same component housing unit. As a result, the number of wirings connected between the component housing units can be suppressed. Thus, the connection work between the component housing units can be simplified. In addition, the number of wirings that prevents mounting of components can be reduced and the number of mounted components can be further increased.

Figure 4:
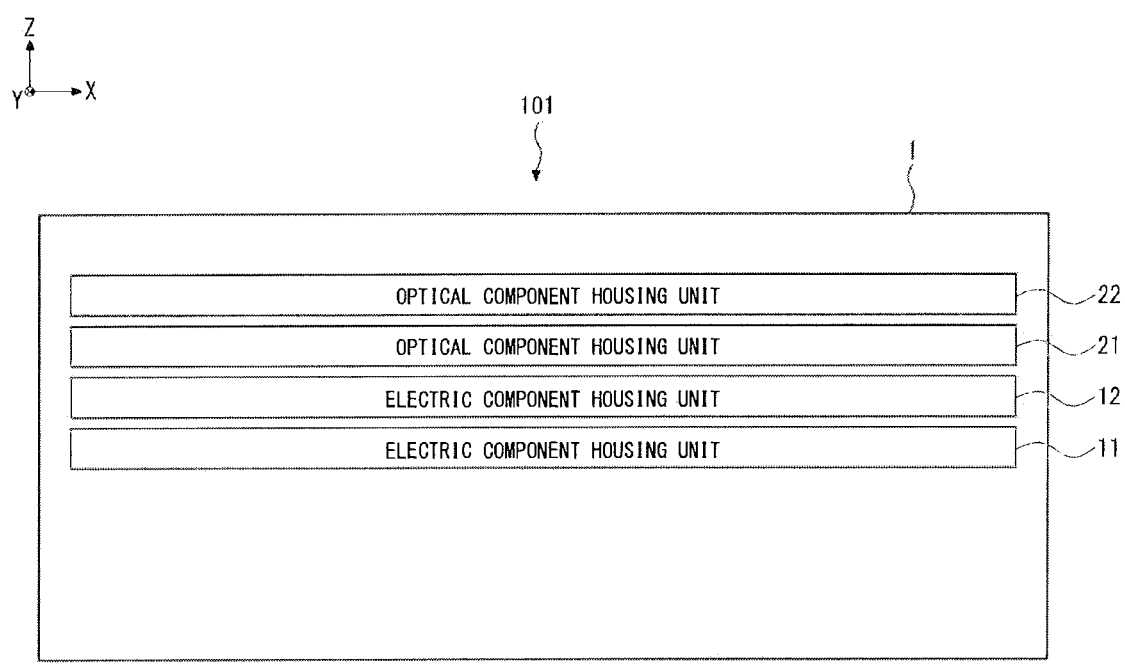
FIG. 4 illustrates a cross section of a submarine optical transmission apparatus in a plane parallel to an axial direction and a stacking direction.
Figure 5:
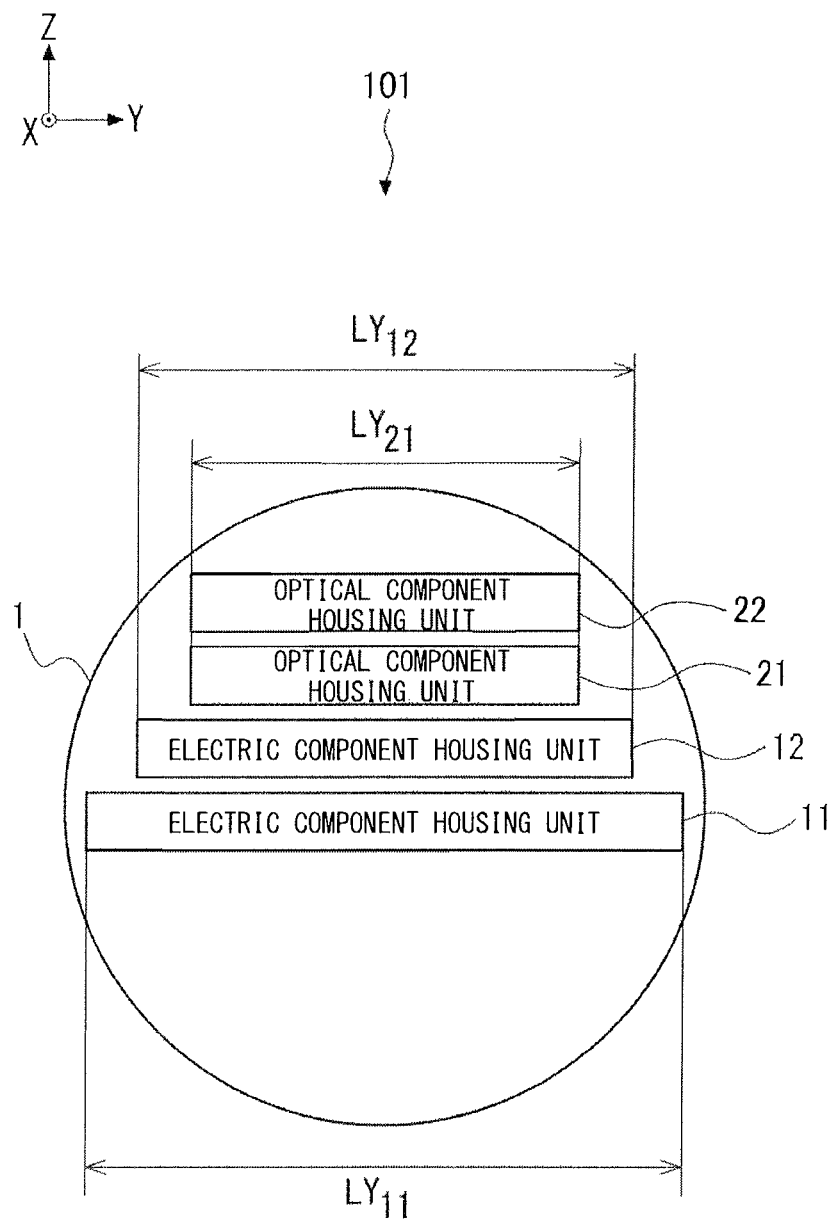
FIG. 5 illustrates a cross section of the submarine optical transmission apparatus in a plane normal to the axial direction.

In the above-described submarine optical transmission apparatus 100, one electric component housing unit 11 and one optical component housing unit 21 are disposed in the case 1, and, however, the arrangement of the housing units is not limited to this. Hereinafter, a submarine optical transmission apparatus 101 that is a modified example of the submarine optical transmission apparatus 100 will be described. FIG. 4 illustrates a cross section of the submarine optical transmission apparatus 101 in a plane (X-Z plane) parallel to the axial direction (X-direction) and the stacking direction (Z-direction). FIG. 5 illustrates a cross section of the submarine optical transmission apparatus 101 in a plane normal to the axial direction (X-direction) (Y-Z Plane).

In the submarine optical transmission apparatus 101, the electric component housing unit 11 is arranged in the center of the case 1. On the electric component housing unit 11, an electric component housing unit 12 and optical component housing units 21 and 22 are stacked in this order. In the present configuration, the internal length of the case 1 in the Y-direction becomes smaller as the distance from the electric component housing unit 11 in the Z-direction increases. Therefore, the lengths of the electric component housing unit 12 and the optical component housing units 21 and 22 in the Y-direction are smaller than the length of the electric component housing unit 11 in the Y-direction. In FIG. 5, the length $LY_{12}$ in the Y-direction of the electric component housing unit 12 is smaller than the length $LY_{11}$ in the Y-direction of the electric component housing unit 11. The length $LY_{21}$ of the optical component housing units 21 and 22 in the Y-direction is smaller than the length $LY_{12}$ of the electric component housing unit 12 in the Y-direction.

Although the example in which the four housing units are stacked has been described above, the number of housing units to be stacked may be any number of three, or five or more.

As described above, when a plurality of housing units are stacked and arranged inside the case 1, the housing units can be housed inside the case 1 by determining the lengths in the Y-direction according to the locations of the housing units.

It is also possible to design the housing unit according to the number of mounted components and the size of mounted components. For example, it is possible to increase the length in the Y-direction of the housing unit in which a large number of components are mounted or the component housing unit in which large components are mounted. Further, it is also possible to reduce the length in the Y-direction of the housing unit in which a relatively small number of components are mounted or the component housing unit in which small components are mounted.

For example, components having a relatively large size, such as a power supply unit, may be mounted on the electric component housing unit 11. The electric component housing unit 12 may be provided with a component such as a control board for controlling an optical amplifier mounted in the optical component housing unit. A relatively large-sized component such as an EDFA and an optical amplifier having an excitation light source may be mounted on the optical component housing 21. The optical component housing unit 22 may house an extra length part of an optical fiber connecting the optical components. Thus, the housing unit can be flexibly designed according to the application.

Second Example Embodiment

Figure 6:
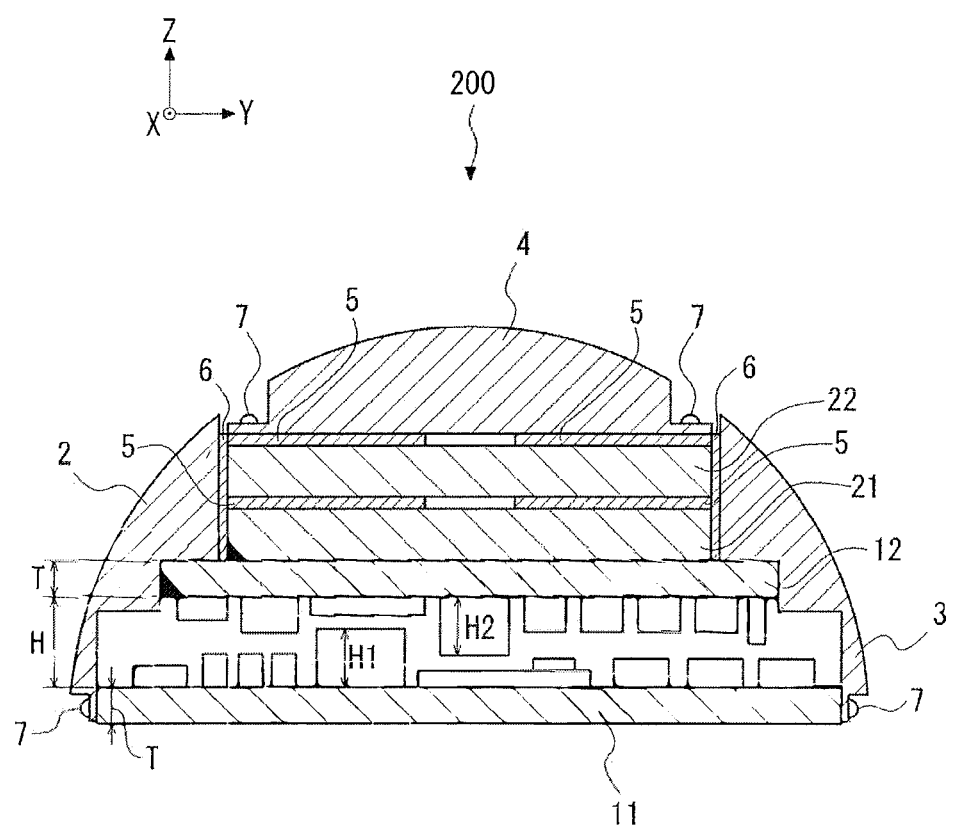
FIG. 6 illustrates a part of a cross section of a submarine optical transmission apparatus according to a second example embodiment in a plane parallel to an axial direction and a stacking direction.

A submarine optical transmission apparatus 200 according to a second example embodiment will be described. FIG. 6 illustrates a part of a cross section of the submarine optical transmission apparatus 200 in a plane (X-Z plane) parallel to an axial direction (X-direction) and a stacking direction (Z-direction). The submarine optical transmission apparatus 200 has a configuration in which support members 2 to 4 are added to the inside of the case 1 in order to fix positions of stacked housing units. In FIG. 6, the case 1 is omitted for simplicity.

In the present configuration, a surface on which components of the electric component housing unit 11 are mounted faces the Z (+) direction, and a surface on which components of the electric component housing unit 12 are mounted faces the Z (−) direction. That is, the component mounting surface of the electric component housing unit 11 and the component mounting surface of the electric component housing unit 12 are opposed to each other. Thus, the space occupied by the electric component housing unit 11 and the electric component housing unit 12 can be suppressed. The reason will be described below.

In the cross section illustrated in FIG. 6, a height of the region occupied by the electric component housing unit 11 and the electric component housing unit 12 is 2T+H which is the sum of a substrate thickness T of the electric component housing unit 11 and the electric component housing unit 12 and a height H of a space in which the component is provided. Here, it is assumed that the height of the highest component among the components mounted in the electric component housing unit 11 is H1, and the height of the highest component among the components mounted in the electric component housing unit 12 is H2. Further it is assumed that H1 and H2 are greater than H/2 and less than H (i.e. H/2<H1<H, H/2<H2<H).

Unlike the present configuration, when the component mounting surface of the electric component housing unit 11 does not face the component mounting surface of the electric component housing unit 12, the height of the region occupied by the electric component housing unit 11 and the electric component housing unit 12 is greater than the sum of the substrate thicknesses T of the electric component housing unit 11 and the electric component housing unit 12, the height H1 of the highest component mounted on the electric component housing unit 11, and the height H2 of the highest component mounted on the electric component housing unit 12 (2T+H1+H2).

On the other hand, in the present configuration, as illustrated in FIG. 6, the highest component among the components mounted on the electric component housing unit 11 and the highest component among the components mounted on the electric component housing unit 12 are provided at positions where they do not interfere with each other. Therefore, it is possible to cause the height H of the space where the components are provided to be less than H1+H2 (H<H1+H2). Thus, it can be understood that the space occupied by the electric component housing unit 11 and the electric component housing unit 12 can be suppressed.

The support member 2 is provided to hold the ends of the electric component housing units 11 and 12 and the optical component housing units 21 and 22 on a Y (−) side of the substrate. The support member 3 is provided to hold the ends of the electric component housing units 11 and 12 and the optical component housing units 21 and 22 on a Y (+) side of the substrate. The support members 2 and 3 are fixed to the electric component housing unit 11 by a screw 7, for example.

As described above, the lengths of the electric component housing units 11 and 12 and the optical component housing units 21 and 22 in the Y-direction are not uniform. Therefore, the inner wall surfaces of the support members 2 and 3 holding the housing units have a stepped shape so that the housing units having different sizes can be held. Thus, the electric component housing units 11 and 12 and the optical component housing units 21 and 22 can be protected from a force in the stacking direction and a force in the Y-direction applied by water pressure, and pressure resistance of the case 1 can be reinforced. Further, a configuration may be adopted in which the force applied by the water pressure is received only by the case 1, and the force by the water pressure is not applied to the support member.

The support members 3 and 4 also function as heat dissipating members for conducting heat generated in the electric component housing unit and the optical component housing unit part to the housing 1.

The support member 4 is arranged on the optical component housing unit 22. The support member 4 is fixed to the optical component housing unit 22 by the screw 7, for example.

An inner surface of the support member 4, that is, a surface facing the optical component housing unit 22, is a plane parallel to the X-Y plane. The contact area between the component housing unit 22 and the support member 4 can be increased. An outer surface of the support member 4 in contact with the case 1 has a curved shape along the inner surface of the case 1.

As a result, the electric component housing units 11 and 12, and the optical component housing units 21 and 22 can be protected from the force applied by the water pressure in the stacking, and the pressure resistance of the case 1 can be reinforced. Further, since the area in which the case 1 and the support member 4 contact with each other and the area in which the optical component housing unit 22 and the support member 4 contact with each other can be enlarged, the heat generated in the component housing unit can be efficiently conducted to the case 1. Further, a configuration may be adopted in which the force applied by the water pressure is received only by the case 1, and the force by the water pressure is not applied to the support member.

The support members 2 to 4 may be configured of any material depending on required mechanical strength and required thermal conductivity. The support member 2 to 4 may be configured of the same or different materials depending on the required mechanical strength and required thermal conductivity. For example, in order to efficiently conduct the heat generated in the component housing unit to the case 1, the substrate may be made of the material having the thermal conductivity higher than that of the substrate in the component housing unit. The support member is preferably configured of metal material having the high thermal conductivity, such as aluminum or stainless steel.

As illustrated in FIG. 6, a spacer 5 having high thermal conductivity may be inserted between the support member 4 and the optical component housing unit 22. A spacer 6 having the high thermal conductivity may be inserted between the Y-direction ends of the optical component housing units 21 and 22, and the support members 2 and 3.

When the support member is fixed by the screw 7 as illustrated in FIG. 6, a gap is formed between the screw 7 and the case 1, which may cause deterioration of heat radiation. The heat radiation characteristics may be secured by providing a cap for covering the screw 7, which is configured to contact the inner surface of the case 1 using the material having high thermal conductivity.

The heat conducted to the case 1 is radiated from the case 1 to an external member. Therefore, as described above, by increasing the contact area between the support members 2 to 4 and the case 1, it is possible to improve the heat radiation characteristics of the submarine optical transmission apparatus 200.

Figure 7:
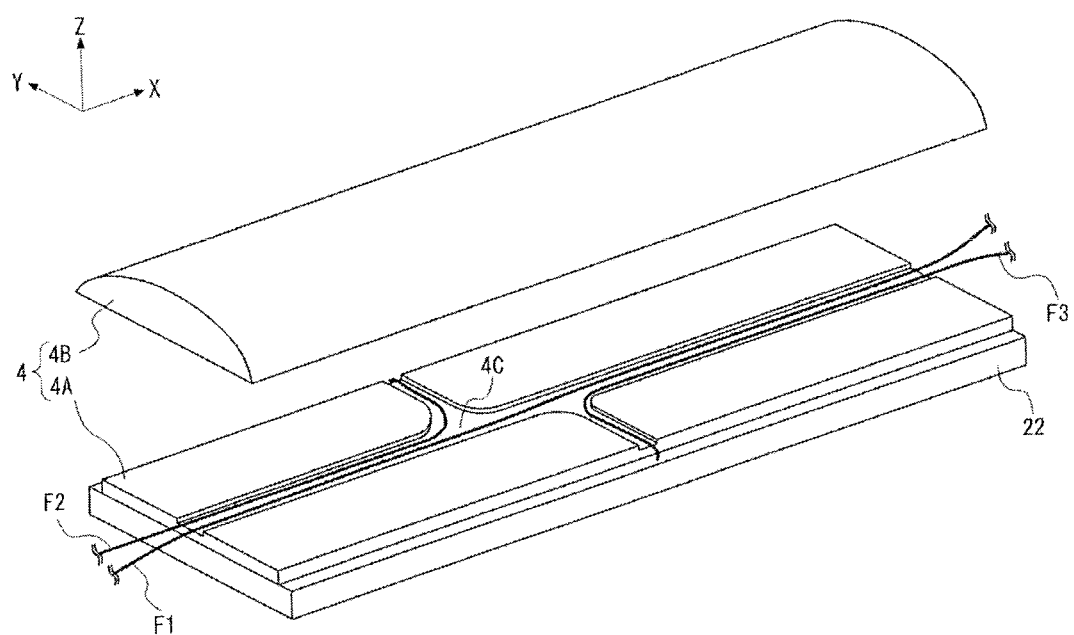
FIG. 7 illustrates an example of a configuration of a support member of the submarine optical transmission apparatus according to the second example embodiment.

Next, the configuration of the support member 4 will be described. FIG. 7 illustrates an example of the configuration of the support member 4 of the submarine optical transmission apparatus 200 according to the second example embodiment. As illustrated in FIG. 7, a flat plate member 4A and a member 4B placed on the flat plate member 4A may constitute the support member 4. The flat plate member 4A is a lower side (Z (−) side) member when the support member 4 is divided by a plane parallel to the X-Y plane. The member 4B is an upper side (Z (+) side) member when the support member 4 is divided by the plane parallel to the X-Y plane.

A groove 4C is formed on a Z (+) side surface of the flat plate member 4A. In this example, the optical fiber F1 is housed in the groove 4C to pass through the flat plate member 4A approximately in the axial direction (X-direction). The optical fiber F2 enters the groove 4C from an X (−) side of the flat plate member 4A along the axial direction (X-direction), then bends toward the Y (+) direction, and is housed in the groove 4C to reach the optical component housing unit below the flat plate member 4A. The optical fiber F3 enters the groove 4C from an X (+) side of the flat plate member 4A along the axial direction (X-direction), then bends toward the Y (−) direction, and is housed in the groove 4C to reach the optical component housing unit below the flat plate member 4A.

After the optical fiber is housed in the groove 4C, the flat plate member 4A is covered with the member 4B to fix and protect the optical fiber.

The groove for housing the optical fiber may be provided on the lower surface of the member 4B (Z (−) side face). Further, a groove for housing the optical fiber may be provided in one or both of the flat plate member 4A and the member 4B.

As described above, according to the support member 4 illustrated in FIG. 7, it can be understood that the optical fiber inside the submarine optical transmission apparatus 200 can be efficiently housed.

Although not illustrated, the support members 2 and 3 may be also provided with grooves capable of housing one or both of the optical fiber and the electric wiring as necessary.

Third Example Embodiment

Figure 8:
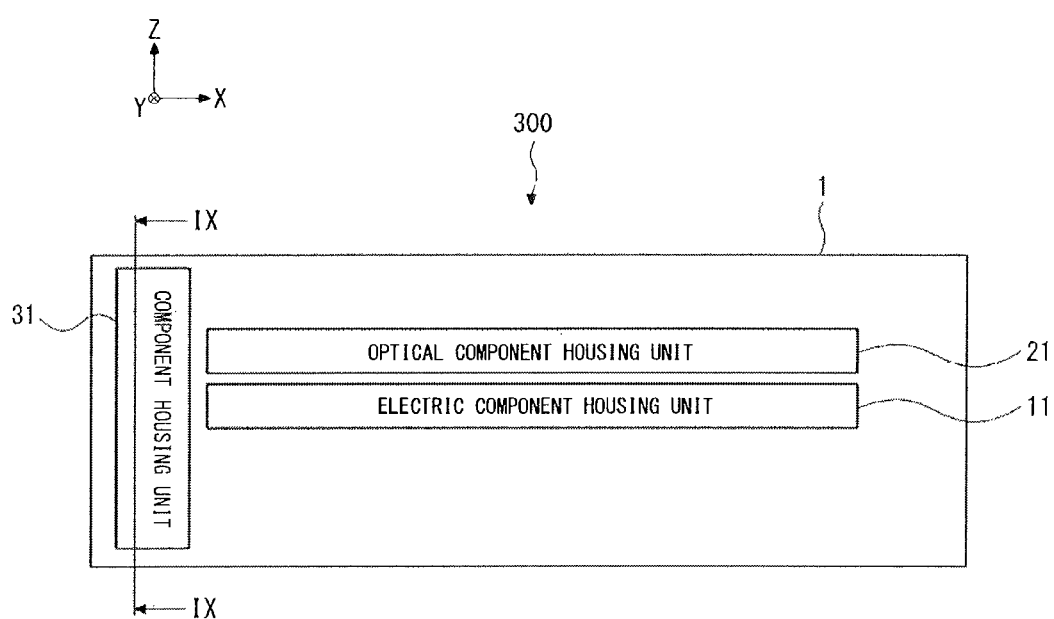
FIG. 8 illustrates a cross section of a submarine optical transmission apparatus according to the third example embodiment in a plane parallel to an axial direction and a stacking direction.
Figure 9:
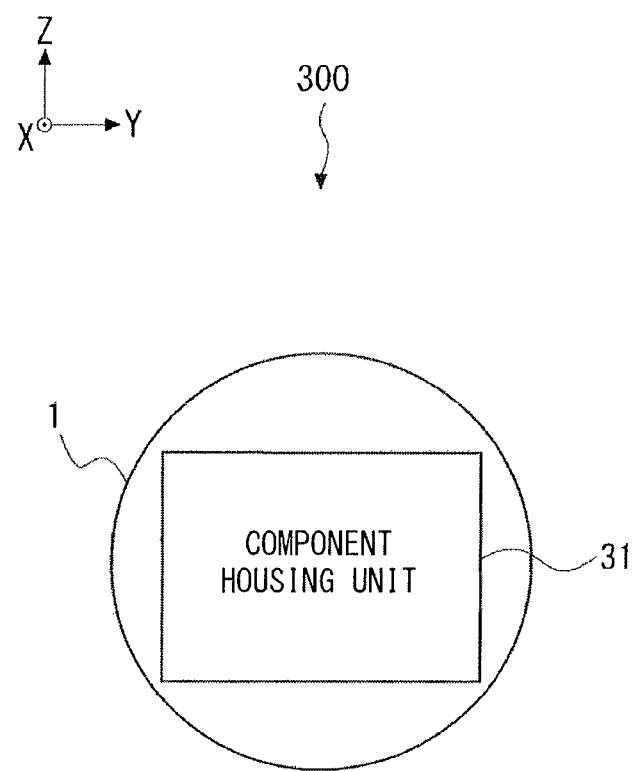
FIG. 9 illustrates a cross section of the submarine optical transmission apparatus according to the third example embodiment in a plane normal to the axial direction (X-direction)

A submarine optical transmission apparatus 300 according to a third example embodiment will be described. FIG. 8 illustrates a cross section of the submarine optical transmission apparatus 300 in a plane (X-Z plane) parallel to an axial direction (X-direction) and a stacking direction (Z-direction). FIG. 9 illustrates a cross section of the submarine optical transmission apparatus 300 in a plane (IX-IX line in FIG. 8) normal to the axial direction (X-direction). The submarine optical transmission apparatus 300 has a configuration in which a component housing unit 31 (also referred to as a second component housing unit) is added to the submarine optical transmission apparatus 100 according to the first example embodiment.

Unlike the electric component housing unit and the optical component housing unit according to the second and first embodiments, the component housing unit 31 is configured as a plate-shaped member having a plane (Y-Z plane) normal to the axial direction (X-direction) as a principal plane. The cross-section of the component housing portion 31 parallel to the axial direction may be any shape, such as rectangular or circular.

In this example, at the ends of the electric component housing unit 11 and the optical component housing unit 21 in the X (−) direction, the component housing unit 31 is disposed. The component housing unit 31 may be an electric component housing unit for housing various electric components such as, for example, a control circuit, a power supply circuit, and a surge protection circuit. The component housing unit 31 may be an optical component housing unit for housing an optical component, an extra length of a fiber, or the like. The housed optical components may include various optical components such as optical amplifiers, optical switches, photodiodes, wavelength selective switches, optical channel monitors, variable optical attenuators, and couplers.

Not only one component housing unit 31 but also two or more component housing units 31 may be disposed. The component housing unit 31 may be disposed at one or both of an end in the X (−) direction and an end in the X (+) direction of the electric component housing unit 11 and the optical component housing unit 21.

As described above, according to the present configuration, the housing units stacked in the Z-direction and the component housing units arranged in the X-direction can be mounted together in the submarine optical transmission apparatus 300. As a result, since it is possible to select the shape of the component housing unit on which the component is mounted in accordance with the shape and function of the component, the degree of freedom in designing the submarine optical transmission apparatus can be improved.

Fourth Example Embodiment

Figure 10:
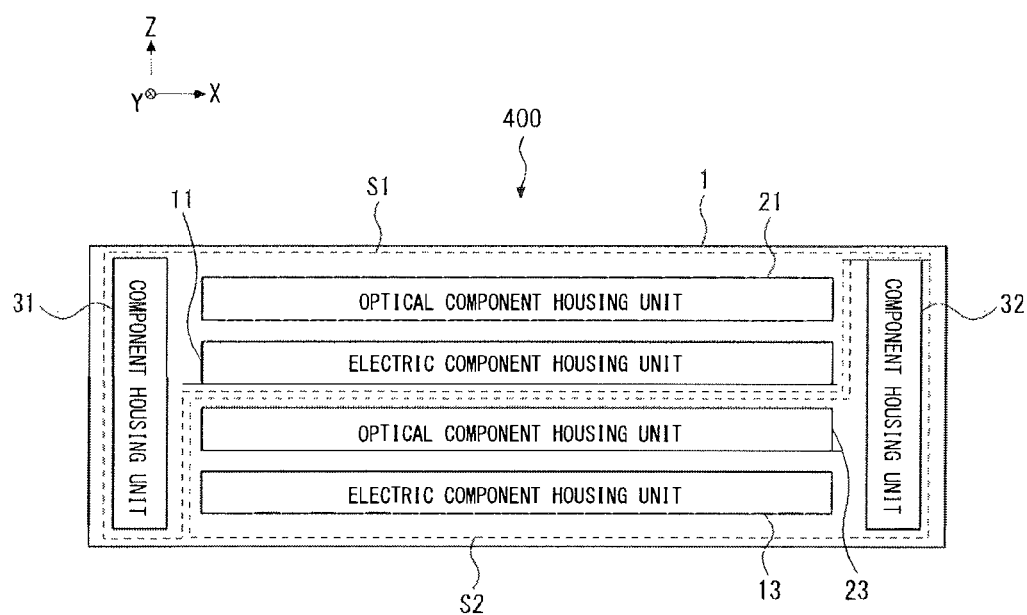
FIG. 10 illustrates a cross section of a submarine optical transmission apparatus according to a fourth example embodiment in a plane parallel to an axial direction and a stacking direction.

A submarine optical transmission apparatus 400 according to a fourth example embodiment will be described. The submarine optical transmission apparatus 400 is a modified example of the submarine optical transmission apparatus 300, and a communication system having different specifications is mounted thereon. FIG. 10 illustrates a cross section of the submarine optical transmission apparatus 400 in a plane (X-Z plane) parallel to the axial direction (X-direction) and the stacking direction (Z-direction).

The submarine optical transmission apparatus 400 has a configuration in which an electric component housing unit 13, an optical component housing unit 23, and a component housing unit 32 (also referred to as the second component housing unit) are added to the submarine optical transmission apparatus 300.

In this example, the electric component housing unit 13 and the optical component housing unit 23 are stacked below the electric component housing unit 11 and the optical component housing unit 21 (Z (−) side). At the ends of the electric component housing unit 13 and the optical component housing unit 23 in the X (+) direction, a component housing unit 32 is disposed. The component housing unit 32, like the component housing unit 31, may be an electric component housing unit for housing various electric components such as a control circuit, a power supply circuit, and a surge protection circuit. The component housing unit 32 may be an optical component housing unit for housing an optical component, an extra length of a fiber, or the like, similarly to the component housing unit 31. The housed optical components may include various optical components such as optical amplifiers, optical switches, photodiodes, wavelength selective switches, optical channel monitors, variable optical attenuators, and couplers.

The electric component housing unit 11, the optical component housing unit 21, and the component housing unit 31 constitute a communication system S1 (also referred to as a first communication system) for performing optical communication according to predetermined specifications. The electric component housing unit 13, the optical component housing unit 23, and the component housing unit 32 constitute a communication system S2 (also referred to as a second communication system) for performing optical communication according to predetermined specifications. Here, the communication specification of the communication system S1 is different from the communication specification of the communication system S2. For example, the communication system S1 and the communication system S2 may have different multiplexing methods, modulation methods, wavelength bands, etc., of optical signals to be transmitted and received.

In the present configuration, a space may be provided between the electric component housing unit 11 of the communication system S1 and the electric component housing unit 13 of the communication system S2. An insulating member may be inserted into the space. The space and the insulating member can improve the breakdown voltage between the communication system S1 and the communication system S2. Further, since the thermal conductivity of the space and the insulator is relatively low, it is possible to suppress the conduction of heat generated in one of the communication system S1 and the communication system S2 to the other.

In other words, the submarine optical transmission apparatus 400 can mount a plurality of communication systems for performing communication with different specifications inside the case 1.

Although the communication system S1 has been described as including the component housing unit 31, the component housing unit 31 may be excluded as appropriate. Although the communication system S2 has been described as including the component housing unit 32, the component housing unit 32 may be excluded as appropriate.

Even in the present embodiment, it should be appreciated that it is possible to provide the support members as described in the second example embodiment in order to hold the electric component housing units 11 and 13, and the optical component housing units 21 and 23.

Other Example Embodiments

The present invention is not limited to the above-described example embodiments, and can be modified as appropriate without departing from the scope of the invention. For example, although the case 1 has been described as a cylindrical member in the above example embodiments, it may be a member of another shape. For example, a cylindrical member having a polygonal cross section normal to the axial direction may be used as the housing. However, in view of the fact that the submarine optical transmission apparatus is installed on the seabed, the case is preferably a cylindrical member in order to secure the pressure resistant strength. In addition, the use of the cylindrical member makes it possible to secure the pressure resistance with a thinner wall thickness than that of the members of other shapes, thereby reducing the weight of the housing. Further, by using the cylindrical member, it is possible to realize a case having a larger internal volume than a member having another cross-sectional shape such as a polygon having the same outer seize.

The shape of the component mounting surfaces of the electric component housing unit and the optical component housing unit is not limited to a rectangular shape, and may be any shape as long as they are housed in the case 1.

While the present invention has been described above with reference to example embodiments, the present invention is not limited to the example embodiments stated above.

(Supplementary Note 1) A submarine optical transmission apparatus including: a plurality of first component housing units configured to be capable of housing either or both of an optical component and an electric component and to be stacked in a first direction, and a case configured to be capable of housing the stacked first component housing units, a longitudinal direction thereof being a second direction orthogonal to the first direction.

(Supplementary Note 2) The submarine optical transmission apparatus according to Supplementary Note 1, further including a support member disposed in the case and configured to reinforce pressure resistance of the case.

(Supplementary Note 3) The submarine optical transmission apparatus according to Supplementary Note 2, in which the support member is configured to be capable of housing an optical fiber connecting between the optical components.

(Supplementary Note 4) The submarine optical transmission apparatus according to Supplementary Note 2 or 3, in which the support member has a shape along an inner surface of the case.

(Supplementary Note 5) The submarine optical transmission apparatus according to any one of Supplementary Notes 1 to 4, in which
the first component housing unit includes a substrate whose principal surface is normal to the first direction, and either or both of the optical component and the electric component are mounted on the substrate.

(Supplementary Note 6) The submarine optical transmission apparatus according to any one of Supplementary Notes 1 to 5, further including a second component housing unit that is plate-like and has a principal surface normal to the first direction.

(Supplementary Note 7) The submarine optical transmission apparatus according to any one of Supplementary Notes 1 to 5, in which
a part of the first component housing units constitute a first communication system, and a part of the first component housing units other than the first component housing units included in the first communication system constitute a second communication system.

(Supplementary Note 8) The submarine optical transmission apparatus according to Supplementary Note 7, in which a space separating the first communication system from the second communication system is disposed between the first communication system from the second communication system.

(Supplementary Note 9) The submarine optical transmission apparatus according to Supplementary Note 8, in which an insulating member is inserted into the space between the first communication system from the second communication system.

(Supplementary Note 10) The submarine optical transmission apparatus according to any one of Supplementary Notes 7 to 9, further including a second component housing unit that is plate-like and has a principal surface normal to the first direction, in which a part of the first component housing units constitute a first communication system, and a part of the first component housing units other than the first component housing units included in the first communication system constitute a second communication system.

(Supplementary Note 11) A submarine optical communication system including: a first base station and a second base station provided on land; a submarine optical transmission apparatus connected to the first base station and the second base station through submarine cables, in which the submarine optical transmission apparatus includes: a plurality of first component housing units configured to be capable of housing either or both of an optical component and an electric component and to be stacked in a first direction, and a case configured to be capable of housing the stacked first component housing units, a longitudinal direction thereof being a second direction orthogonal to the first direction.

(Supplementary Note 12) The submarine optical communication system according to Supplementary Note 11, in which the submarine optical transmission apparatus further includes a support member disposed in the case and configured to reinforce pressure resistance of the case.

(Supplementary Note 13) The submarine optical communication system according to Supplementary Note 12, in which the support member is configured to be capable of housing an optical fiber connecting between the optical components.

(Supplementary Note 14) The submarine optical communication system according to Supplementary Note 12 or 13, in which the support member has a shape along an inner surface of the case.

(Supplementary Note 15) The submarine optical communication system according to any one of Supplementary Notes 11 to 14, in which the first component housing unit includes a substrate whose principal surface is normal to the first direction, and either or both of the optical component and the electric component are mounted on the substrate.

(Supplementary Note 16) The submarine optical communication system according to any one of Supplementary Notes 11 to 15, further comprising a second component housing unit that is plate-like and has a principal surface normal to the first direction.

(Supplementary Note 16) The submarine optical communication system according to any one of Supplementary Notes 11 to 15, in which a part of the first component housing units constitute a first communication system, and a part of the first component housing units other than the first component housing units included in the first communication system constitute a second communication system.

(Supplementary Note 18) The submarine optical communication system according to Supplementary Note 17, in which a space separating the first communication system from the second communication system is disposed between the first communication system from the second communication system.

(Supplementary Note 19) The submarine optical communication system according to Supplementary Note 18, in which an insulating member is inserted into the space between the first communication system from the second communication system.

(Supplementary Note 20) The submarine optical communication system according to any one of Supplementary Notes 17 to 19, in which the submarine optical transmission apparatus further includes a second component housing unit that is plate-like and has a principal surface normal to the first direction, a part of the first component housing units constitute a first communication system, and a part of the first component housing units other than the first component housing units included in the first communication system constitute a second communication system.

The present invention has been described above with reference to the example embodiments, but the present invention is not limited to the above example embodiments. The configuration and details of the present invention can be modified in various ways which can be understood by those skilled in the art within the scope of the invention.

This application is based upon and claims the benefit of priority from Japanese patent application No. 2018-56773, filed on Mar. 23, 2018, the disclosure of which is incorporated herein in its entirety by reference.

REFERENCE SIGNS LIST

100, 101, 200, 300, 400 SUBMARINE OPTICAL TRANSMISSION APPARATUSES
1 CASE
2 TO 4 SUPPORT MEMBERS
5, 6 SPACERS
7 SCREW
S1, S2 COMMUNICATION SYSTEMS
11 TO 13 ELECTRIC COMPONENT HOUSING UNITS
21 TO 23 OPTICAL COMPONENT HOUSING UNITS
31, 32 COMPONENT HOUSING UNITS
4A FLAT PLATE MEMBER
4B MEMBER
4C GROOVE
B1, B2 BASE STATIONS
C1, C2 SUBMARINE CABLES
F1 TO F3 FIBERS

The invention claimed is:

1. A submarine optical transmission apparatus comprising:
   a plurality of first component housing units configured to be capable of housing either or both of an optical component and an electric component and to be stacked in a first direction;
   a case configured to be capable of housing the stacked first component housing units, a longitudinal direction thereof being a second direction orthogonal to the first direction; and
   a support member disposed in the case and configured to reinforce pressure resistance of the case, wherein
      the support member is configured to be capable of housing an optical fiber connecting between the optical components housed in the first component housing units.

2. The submarine optical transmission apparatus according to claim 1, wherein the support member has a shape along an inner surface of the case.

3. The submarine optical transmission apparatus according to claim 1, wherein
   the first component housing unit comprises a substrate whose principal surface is normal to the first direction, and
   either or both of the optical component and the electric component are mounted on the substrate.

4. The submarine optical transmission apparatus according to claim 1, further comprising a second component housing unit that is plate-like and has a principal surface normal to the second direction.

5. The submarine optical transmission apparatus according to claim 1, wherein
   a part of the first component housing units constitute a first communication system, and a part of the first component housing units other than the first component housing units included in the first communication system constitute a second communication system.

6. The submarine optical transmission apparatus according to claim 5, wherein a space separating the first communication system from the second communication system is disposed between the first communication system from the second communication system.

7. The submarine optical transmission apparatus according to claim 6, wherein an insulating member is inserted into the space between the first communication system from the second communication system.

8. The submarine optical transmission apparatus according to claim 5, further comprising a second component housing unit that is plate-like and has a principal surface normal to the second direction, wherein
   a part of the second component housing units constitute the first communication system, and
   a part of the second component housing units other than the first component housing units included in the first communication system constitute the second communication system.

9. The submarine optical transmission apparatus according to claim 1, wherein the support member comprises a groove which guides the housed optical fiber to the first component housing unit.

10. The submarine optical transmission apparatus according to claim 1, wherein the support member includes a first support member housing the optical fiber and a second support member covering the first support member housing the optical fiber.

11. A submarine optical communication system comprising:
   a first base station and a second base station provided on land;
   a submarine optical transmission apparatus connected to the first base station and the second base station through submarine cables, wherein the submarine optical transmission apparatus comprises:
      a plurality of first component housing units configured to be capable of housing either or both of an optical component and an electric component and to be stacked in a first direction;
      a case configured to be capable of housing the stacked first component housing units, a longitudinal direction thereof being a second direction orthogonal to the first direction; and
      a support member disposed in the case and configured to reinforce pressure resistance of the case, wherein the support member is configured to be capable of housing an optical fiber connecting between the optical components housed in the first component housing units.

12. The submarine optical communication system according to claim 11, wherein the support member has a shape along an inner surface of the case.

13. The submarine optical communication system according to claim 11, wherein
   the first component housing unit comprises a substrate whose principal surface is normal to the first direction, and
   either or both of the optical component and the electric component are mounted on the substrate.

14. The submarine optical communication system according to claim 11, further comprising a second component housing unit that is plate-like and has a principal surface normal to the second direction.

15. The submarine optical communication system according to claim 11, wherein
   a part of the first component housing units constitute a first communication system, and
   a part of the first component housing other units than the first component housing units included in the first communication system constitute a second communication system.

16. The submarine optical communication system according to claim 15, wherein a space separating the first communication system from the second communication system is disposed between the first communication system from the second communication system.

17. The submarine optical communication system according to claim 16, wherein an insulating member is inserted into the space between the first communication system from the second communication system.

18. The submarine optical communication system according to claim 15, wherein
   the submarine optical transmission apparatus further comprises a second component housing unit that is plate-like and has a principal surface normal to the second direction,
   a part of the second component housing units constitute the first communication system, and
   a part of the second component housing units other than the first component housing units included in the first communication system constitute the second communication system.

* * * * *